US012730993B2

(12) United States Patent
Labrot-Rhodes et al.

(10) Patent No.: US 12,730,993 B2
(45) Date of Patent: Sep. 8, 2026

(54) METHOD FOR READING INFORMATION CONTAINED IN AN RFID CHIP EMBEDDED IN A VEHICLE TIRE

(71) Applicant: Continental Automotive Technologies GmbH, Hannover (DE)

(72) Inventors: Louis Labrot-Rhodes, Toulouse (FR); Rémi Fontugne, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 19/291,770

(22) Filed: Aug. 6, 2025

(65) Prior Publication Data

US 2026/0044693 A1 Feb. 12, 2026

(30) Foreign Application Priority Data

Aug. 7, 2024 (FR) ...................................... 2408754

(51) Int. Cl.
*G06K 7/10* (2006.01)
*G06K 19/077* (2006.01)

(52) U.S. Cl.
CPC ... *G06K 7/10366* (2013.01); *G06K 19/07764* (2013.01)

(58) Field of Classification Search
CPC ..................... G06K 7/10366; G06K 19/07764
See application file for complete search history.

(56) References Cited

U.S. PATENT DOCUMENTS 9,475,348 B2 10/2016 Hammer
9,561,695 B2 * 2/2017 Horikoshi ........... B60C 23/0401
9,669,801 B2 6/2017 Utter et al.
10,131,320 B2 11/2018 Schmotzer et al.
10,364,766 B2 * 7/2019 Rocher ................. F02D 41/042
2003/0058118 A1 * 3/2003 Wilson ................ B60C 23/0483 340/442
2012/0259499 A1 * 10/2012 Hiraoka ................ B60R 21/013 701/29.1
2014/0005956 A1 * 1/2014 Patel ....................... B60C 23/04 702/41

(Continued)

FOREIGN PATENT DOCUMENTS

FR 2912235 A1 8/2008
FR 3119814 A1 8/2022

(Continued)

OTHER PUBLICATIONS

French Search Report with English translation issued in corresponding Patent Application FR 2408754 dated Feb. 12, 2025, 34 pages.

*Primary Examiner* — Christle I Marshall
(74) *Attorney, Agent, or Firm* — Buchanan Ingersoll & Rooney PC

(57) ABSTRACT

A method for reading information contained in an RFID chip embedded in the mass of a tire of a motor vehicle wheel equipped with a wheel unit forming part of a tire pressure monitoring system, wherein the wheel unit detects, irrespective of the condition of the wheel (whether or not it is punctured), a wheel removal operation and then an operation for re-inflating the new tire, and the RFID chip is polled by the wheel unit when the re-inflation operation has been detected.

9 Claims, 1 Drawing Sheet

(56) References Cited

U.S. PATENT DOCUMENTS

| | | | | |
|---|---|---|---|---|
| 2015/0273955 | A2 | 10/2015 | Hammer | |
| 2016/0075306 | A1 | 3/2016 | Utter et al. | |
| 2017/0289732 | A1 | 10/2017 | Guinart et al. | |
| 2019/0176546 | A1* | 6/2019 | Guinart | B60C 23/0481 |
| 2021/0208028 | A1* | 7/2021 | Boisset | B60C 23/064 |
| 2023/0406262 | A1 | 12/2023 | Stewart et al. | |
| 2024/0034107 | A1 | 2/2024 | Deleplanque et al. | |
| 2024/0217275 | A1* | 7/2024 | Dudar | B60C 23/0484 |
| 2024/0239143 | A1* | 7/2024 | Schubert | B60C 23/0471 |

FOREIGN PATENT DOCUMENTS

| | | | | |
|---|---|---|---|---|
| JP | 2005100100 | A * | 4/2005 | B60C 23/0442 |
| WO | 2005030498 | A1 | 4/2005 | |
| WO | 2014181511 | A1 | 11/2014 | |

* cited by examiner

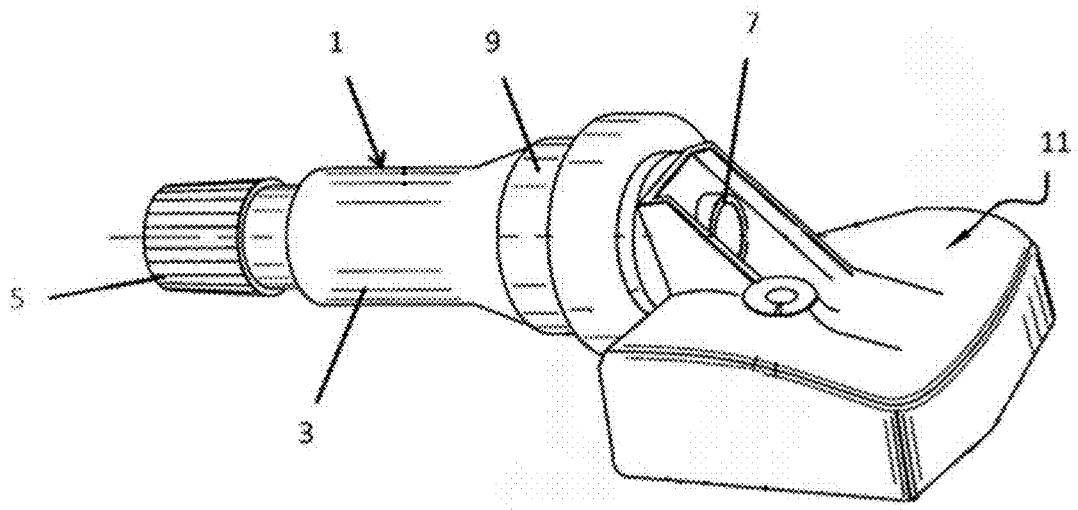
1
9
7
11
5
3

METHOD FOR READING INFORMATION CONTAINED IN AN RFID CHIP EMBEDDED IN A VEHICLE TIRE

CROSS REFERENCE TO RELATED APPLICATION

This application claims priority to French Application No. 2408754, filed Aug. 7, 2024, the contents of such application being incorporated by reference herein.

FIELD OF THE INVENTION

The present invention relates to the field of electronically monitoring the features of the tires of motor vehicles.

BACKGROUND OF THE INVENTION

As is known per se, the features (origin, technical data, etc.) of a motor vehicle tire can be stored inside an RFID chip embedded in the mass of the tire.

"RFID" is an acronym for "Radio Frequency Identification".

An RFID chip can receive and respond to radio requests transmitted by an external, contactless transceiver.

By using an appropriate manual reading tool that is advanced toward the tire, it is possible to access the information contained in the RFID chip, by virtue of an exchange of requests/responses between the reading tool and the chip.

The information thus retrieved in the reading tool then notably can be sent to the memory of an electronic module attached to the rim on which the tire is fitted, with such a module commonly being referred to as a "wheel unit" and forming part of a TPMS (Tire Pressure Monitoring System) type system, notably for monitoring the tire pressure.

The operations for manually reading RFID chips housed inside tires are tedious, and there is a genuine need for them to be automated.

An aspect of the present invention notably aims to address this need.

SUMMARY OF THE INVENTION

An advantage of an aspect of the invention, as well as other advantages, is achieved with a method for reading information contained in an RFID chip embedded in the mass of a tire of a motor vehicle wheel equipped with a wheel unit forming part of a tire pressure monitoring system (TPMS) of the vehicle, wherein a wheel removal operation and then a tire re-inflation operation is detected by the wheel unit, and the RFID chip is polled by the wheel unit when the re-inflation operation has been detected.

By virtue of these features, the information stored in the RFID chip can be automatically retrieved by the wheel unit following a wheel removal operation followed by a tire re-inflation operation, with these operations characterizing a tire change.

Since this specific communication between the wheel unit and the RFID chip only occurs, by virtue of the method according to an aspect of the invention, when a tire is actually changed, any other communication that would reduce the autonomy of the electric battery housed inside the wheel unit is avoided.

Typically, such specific communication only occurs two or three times during the service life of the tire, in order to minimize the impact on the electric battery.

According to other optional features of an aspect of the present invention, taken alone or in combination:

- the wheel removal operation is detected by taking into account pressure variations measured by the wheel units of the vehicle that represent an operation for lifting the vehicle: these pressure variations provide an indirect and simple means for detecting a lifting operation;
- according to a first variant of the method according to an aspect of the invention, applicable to the case of a punctured tire to be changed:
  - a) a wheel unit transmits a signal indicating that one of the tires of the vehicle has punctured; then
  - b) at least one of the other wheel units transmits signals indicating that the vehicle is being lifted; then
  - c) the wheel unit associated with the punctured tire detects an acceleration variation or gradient lower than those of a normal movement of the vehicle when it moves on the ground; then the wheel unit associated with the punctured tire receives a signal indicating that this tire is being changed and monitors the moment when the measured pressure will rise sharply: the combination of conditions a), b), c) means that it is possible to unequivocally establish that the vehicle with the punctured tire is indeed in a situation involving the removal of the wheel fitted with this tire;

- according to a second variant of the method according to an aspect of the invention, applicable to the case of a worn tire to be changed:
  - a) at least one of the wheel units of the vehicle transmits signals indicating that the vehicle is being lifted; then
  - b) a wheel unit transmits a signal indicating that one of the tires of the vehicle is deflated; then the wheel unit associated with the deflated tire monitors the moment when the measured pressure will rise sharply: the combination of these conditions means that it is possible to unequivocally establish that the vehicle with the worn tire is indeed in a situation involving the removal of the wheel fitted with this tire;

- the wheel unit associated with the deflated tire detects an acceleration variation or gradient lower than those of a normal movement of the vehicle when it moves on the ground;
- when said wheel unit is equipped with an accelerometer for measuring movements in a direction parallel to the axis of the wheel, the operation for removing said wheel is detected by measuring this acceleration: this solution provides a very simple alternative to the aforementioned detection of pressure variations when lifting the vehicle;
- when the wheel units of the vehicle are provided with means for accurately evaluating the distances separating these units from one another, the operation for removing said wheel is detected by measuring the variation in the distance of said wheel unit from the other wheel units: this solution provides another very simple alternative to the aforementioned detection of pressure variations when lifting the vehicle.

An aspect of the present invention also relates to a wheel of a motor vehicle equipped with a wheel unit forming part of a TPMS system and a tire containing an RFID chip, with this wheel unit and this RFID chip being configured to communicate with each other according to a method as described above.

An aspect of the present invention also relates to a motor vehicle equipped with a TPMS system and comprising at least two wheels as described above.

BRIEF DESCRIPTION OF THE DRAWINGS

The FIGURE illustrates an example of an assembly comprising a tire valve for a motor vehicle equipped with a wheel unit forming part of a TPMS type system.

DETAILED DESCRIPTION OF EXEMPLARY EMBODIMENTS

Further features and advantages of aspects of the invention will become apparent from reading the following description, with reference to the FIGURE which illustrates an example of an assembly comprising a tire valve for a motor vehicle equipped with a wheel unit forming part of a TPMS type system.

The FIGURE shows an inflation valve 1 for inflating a tire of a motor vehicle, with said valve comprising a body 3 covered by a closure cap 5.

The body 3 comprises a tubular metal part, the end 7 of which located opposite the cap 5 is shown in the FIGURE, with this tubular metal part being coated with a flexible material such as synthetic rubber.

This flexible coating comprises a groove or shoulder 9 for retaining the valve inside an orifice formed in a wheel rim of a motor vehicle (not shown): this is referred to as a "snap-in" type valve.

The end 7 of the tubular metal part shown in the FIGURE is intended to emerge inside the chamber defined by the rim and the tire of the motor vehicle, so as to allow air to enter or exit into and out of this chamber.

A sensor assembly 11, commonly called "wheel unit", is attached to the valve 3, for example, at the end of the tubular metal part 7.

As is known per se, this wheel unit 11 comprises a sensor for detecting the pressure inside the chamber defined by the rim and the tire, as well as an accelerometer, a temperature sensor, means for communicating with the on-board electronic computer (often referred to as "ECU") of a motor vehicle, and a battery for electrically powering the assembly. Such a wheel unit 11 also can be attached to a valve of a type other than the "snap-in" valve described above, such as, for example, a metal valve known per se, or even can be directly secured to a wheel rim, or even can be attached to the inner face of a tire tread.

Within the scope of an aspect of the present invention, the communication means of the wheel unit 11 are also adapted to communicate with an RFID chip embedded in the tire fitted on the rim of the wheel.

Typically, this communication can occur over a low frequency band of approximately 125 kHz.

According to a first scenario corresponding to the case of a tire that has punctured, the wheel unit 11 detects this puncture, which is expressed as a drop in air pressure inside the tire.

This tire then must be changed, which involves lifting the vehicle, which either can be specifically carried out in line with the punctured tire, by means of a jack, or even can be generally carried out with a lifting ramp that lifts the whole vehicle.

When specifically lifting the vehicle by means of a jack, it has been found that the tire located diagonally opposite the punctured tire (for example, the left rear tire if the right front tire has punctured) is slightly over-pressured, typically of the order of an additional 1 kPa, due to the weight transfer of the vehicle.

When generally lifting the vehicle by means of a lifting ramp, it has been found that the 2 or 3 tires that had not punctured were slightly under-pressured, typically of the order of 2 kPa less than their pressure when the vehicle is resting on the ground.

This tire pressure information is transmitted to the ECU of the motor vehicle by the wheel units of each wheel.

When the ECU receives the following information from the wheel units:

a) signal from a wheel unit indicating that one of the tires has punctured; then b) signals from at least one of the other wheel units indicating that the vehicle is being lifted (by comparing pressures as indicated above), and that the wheel unit associated with the punctured tire detects an acceleration variation or gradient lower than those of a normal movement of the vehicle when it moves on the ground, with these movements therefore indicating a wheel change operation, then the ECU returns a signal to the wheel unit associated with the punctured tire indicating that this tire is being changed and that the moment when the measured pressure will rise sharply needs to be continuously monitored, but with periodic acquisitions of pressure.

This increase in pressure corresponds to the re-inflation of the tire that has been fitted to the rim of the wheel, replacing the punctured tire.

When the wheel unit detects this increase in pressure, it establishes a specific communication with the RFID chip that is embedded in the mass of the new tire, allowing the information stored in this chip that characterizes the new tire to be retrieved.

This information can relate, for example, to the origin of the tire, as well as to a certain number of technical features (width and thickness of the tread, type of material forming this tread, etc.).

All this information can be sent to the ECU of the vehicle by the wheel unit, which ECU can then use it, for example, for navigation assistance purposes, or for predicting the level of tire wear.

This information also can be transmitted by the ECU to servers located outside the vehicle for centralized processing.

As will have been understood in the light of the above, the RFID chip embedded in the mass of the tire is only called upon by the wheel unit at the moment when this tire is changed, following a puncture.

This unique request allows the information contained in the RFID chip to be automatically retrieved with minimum consumption of the electrical energy of the wheel unit battery.

As a variant of the above, the information concerning tire pressure variations corresponding to the lifting operations could be transmitted directly between the wheel units, without passing through the ECU, provided that the ECU has previously connected these wheel units.

According to a second scenario, corresponding to the case of a worn tire to be replaced, steps a) and b) mentioned in the first scenario are reversed, i.e., a situation involving lifting the vehicle is detected first, followed by a situation involving a sharp drop in pressure in one of the tires (but not a puncture) corresponding to the deflation of the worn tire for the replacement thereof.

The final step is identical, i.e., communication between the wheel unit and the new tire is only established when the tire has been re-inflated.

As a variant of the method described above, and in the case whereby the wheel unit comprises an accelerometer for measuring movements in a direction parallel to the axis of the wheel, it is possible to contemplate replacing steps a) to c) of the first and second scenarios with a measurement of this acceleration, allowing a wheel removal operation to be characterized, and therefore allowing a punctured or worn tire to be replaced.

According to yet another possible variant, and in the case whereby the wheel units are provided with means for accurately evaluating the distances separating these units from one another, such as, for example, channel sounding type means proposed by Bluetooth® technology, it is possible to contemplate replacing steps a) to c) of the first and second scenarios with a measurement of the variation in distance from one wheel unit to the other wheel units, allowing a wheel removal operation to be characterized, and therefore allowing a punctured or worn tire to be replaced.

Of course, the invention is described above by way of an example. It should be understood that a person skilled in the art will be able to develop various alternative embodiments of the invention, yet without departing from the scope of the invention.

The invention claimed is:

1. A method for reading information contained in an RFID chip embedded in the mass of a tire of a motor vehicle wheel equipped with a wheel unit forming part of a tire pressure monitoring system of the vehicle, wherein a wheel removal operation and then a tire re-inflation operation is detected by the wheel unit, and the RFID chip is polled by the wheel unit when the re-inflation operation has been detected.

2. The method as claimed in claim 1, wherein the wheel removal operation is detected by taking into account pressure variations measured by the other wheel units of the vehicle that represent an operation for lifting the vehicle.

3. The method as claimed in claim 2, wherein:

a) the wheel unit transmits a signal indicating that one of the tires of the vehicle has punctured; then b) at least one of the other wheel units transmits signals indicating that the vehicle is being lifted; then c) the wheel unit associated with the punctured tire detects an acceleration variation or gradient lower than those of a normal movement of the vehicle when it moves on the ground; then the wheel unit associated with the punctured tire receives a signal indicating that this tire is being changed and monitors the moment when the measured pressure will rise sharply.

4. The method as claimed in claim 2, wherein:

a) at least one of the other wheel units of the vehicle transmits signals indicating that the vehicle is being lifted; then b) the wheel unit transmits a signal indicating that one of the tires of the vehicle is deflated; then the wheel unit associated with the deflated tire monitors the moment when the measured pressure will rise sharply.

5. The method as claimed in claim 4, wherein the wheel unit associated with the deflated tire detects an acceleration variation or gradient lower than those of a normal movement of the vehicle when it moves on the ground.

6. The method as claimed in claim 2, wherein, when said wheel unit is equipped with an accelerometer for measuring movements in a direction parallel to an axis of the wheel, the operation for removing said wheel is detected by measuring this acceleration.

7. The method as claimed in claim 2, wherein, when the wheel units of the vehicle are provided with means for accurately evaluating the distances separating these units from one another, the operation for removing said wheel is detected by measuring the variation in the distance of said wheel unit from the other wheel units.

8. A wheel of a motor vehicle equipped with a wheel unit forming part of a tire pressure monitoring system and a tire containing an RFID chip, with this wheel unit and this RFID chip being configured to communicate with each other according to a method as claimed in claim 1.

9. A motor vehicle equipped with a tire pressure monitoring system and comprising at least two wheels as claimed in claim 8.

* * * * *